(12) United States Patent
Kokel et al.

(10) Patent No.: US 11,136,461 B2
(45) Date of Patent: Oct. 5, 2021

(54) DEGRADABLE COMPOSITE STRUCTURES

(71) Applicant: Schlumberger Technology Corporation, Sugar Land, TX (US)

(72) Inventors: Philip Kokel, Houston, TX (US);
Shitong S. Zhu, Waban, MA (US);
Matthew Godfrey, Sugar Land, TX (US); Meng Qu, Waltham, MA (US);
Jahir A. Pabon, Newton, MA (US);
Yucun Lou, Belmont, MA (US);
Francois M. Auzerais, Boston, MA (US); John David Rowatt, Katy, TX (US); Roman Kats, Brookline, MA (US); Gauri Joshi, Pune (IN);
Miranda Amarante, Katy, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/534,685

(22) PCT Filed: Dec. 18, 2015

(86) PCT No.: PCT/US2015/066738
§ 371 (c)(1),
(2) Date: Jun. 9, 2017

(87) PCT Pub. No.: WO2016/106134
PCT Pub. Date: Jun. 30, 2016

(65) Prior Publication Data
US 2017/0369708 A1 Dec. 28, 2017

Related U.S. Application Data

(60) Provisional application No. 62/095,144, filed on Dec. 22, 2014.

(51) Int. Cl.
| | |
|---|---|
| C08L 101/16 | (2006.01) |
| C08K 3/013 | (2018.01) |
| C08K 3/22 | (2006.01) |
| C08K 7/02 | (2006.01) |
| C09K 8/035 | (2006.01) |
| C08L 67/04 | (2006.01) |
| C08K 5/20 | (2006.01) |
| C08L 101/12 | (2006.01) |
| C08K 7/14 | (2006.01) |

(52) U.S. Cl.
CPC ............ *C08L 101/16* (2013.01); *C08K 3/013* (2018.01); *C08K 3/22* (2013.01); *C08K 5/20* (2013.01); *C08K 7/02* (2013.01); *C08K 7/14* (2013.01); *C08L 67/04* (2013.01); *C08L 101/12* (2013.01); *C09K 8/035* (2013.01); *C08K 2003/222* (2013.01)

(58) Field of Classification Search
None
See application file for complete search history.

(56) References Cited

U.S. PATENT DOCUMENTS

| | | | |
|---|---|---|---|
| 6,380,138 B1 | 4/2002 | Ischy et al. | |
| 7,093,664 B2 | 8/2006 | Todd et al. | |
| 8,342,094 B2 | 1/2013 | Marya et al. | |
| 2004/0034121 A1* | 2/2004 | Nozaki | C08K 9/08 |
| | | | 523/124 |
| 2008/0093073 A1 | 4/2008 | Bustos et al. | |
| 2008/0196896 A1* | 8/2008 | Bustos | E21B 43/26 |
| | | | 166/281 |
| 2008/0202764 A1 | 8/2008 | Clayton et al. | |
| 2009/0000786 A1* | 1/2009 | Daniels | E21B 43/086 |
| | | | 166/297 |
| 2011/0226479 A1 | 9/2011 | Tippel et al. | |
| 2011/0250626 A1* | 10/2011 | Williams | A01N 63/02 |
| | | | 435/18 |
| 2012/0067581 A1 | 3/2012 | Auzerais et al. | |
| 2013/0292123 A1 | 11/2013 | Murphree et al. | |
| 2014/0360728 A1* | 12/2014 | Tashiro | E21B 43/16 |
| | | | 166/305.1 |
| 2016/0076326 A1 | 3/2016 | Van Petegem et al. | |
| 2017/0121568 A1* | 5/2017 | Strebl | C08G 18/664 |

FOREIGN PATENT DOCUMENTS

CA  2873986 A1  2/2014

OTHER PUBLICATIONS

Schnabelrauch et al. "Degradable phosphate glass fiber reinforced polymer matrices: mechanical properties and cell response", J Mater Sci Mater Med. Jan. 2008;19(1):121-7.
Ensanya et al. "Bioactive functional materials: a perspective on phosphate-based glasses." (2009) J. Mater. Chem., 19: 690-701.
Ahmed et al. "Retention of Mechanical Properties and Cytocompatibility of a Phosphate-Based Glass Fiber/Polylactic Acid Composite." Journal of Biomedical Materials Research Part B: Applied Biomaterials 89: 18-27.
Bennett et al., "Ultrafast chemical reactions between nickel and aluminum powders during shock loading", Applied Physics Letters, 61 (5), 1992, 520-521.
C. W. S Marchi, "Processing of aluminum-nickel intermetallics by reactive infiltration", 1997, Ph.D. Thesis (111 pages).
D.E. Eakins, Role of heterogeneity in the chemical and mechanical shock-response of nickel and aluminum powder mixtures, 2007, Ph.D. Thesis, School of materials and science engineering, Georgia Institue of Technology (424 pages).
S. Cozien-Cazuc, A.J.P., G.S. Walker, I.A. Jones, C.D. Rudd (2009), "Real-Time Dissolution of P40Na20Ca16Mg24 posphate glass fibers." Journal of Non-Crystalline Solids 355: 2514-2521.

(Continued)

*Primary Examiner* — Robert T Butcher
(74) *Attorney, Agent, or Firm* — Cameron R. Sneddon

(57) ABSTRACT

Embodiments may generally take the form of a degradable composite structure and a method for controlling the rate of degradation of a degradable composite structure. An example embodiment may take the form of a degradable polymer matrix composite (PMC) including a matrix having: a degradable polymer, a fiber reinforcement, and particulate fillers. The fiber loading is between approximately 10% to 70% by weight and the particulate loading is between approximately 5% to 60%.

19 Claims, 13 Drawing Sheets

(56) References Cited

OTHER PUBLICATIONS

International Search Report and Written Opinion issued in the related PCT application PCT/US2015/066738, dated Apr. 21, 2016 (9 pages).
International Preliminary Report on Patentability issued in the related PCT application PCT/US2015/066738, dated Jul. 6, 2017 (8 pages).

* cited by examiner

DEGRADABLE COMPOSITE STRUCTURES

CROSS-REFERENCE TO RELATED APPLICATIONS

The present application is related to and claims the benefit of U.S. Provisional Patent Application No. 62/095,144 filed Dec. 22, 2014, which is incorporated by reference herein in its entirety.

FIELD

The subject disclosure generally relates to degradable composite structures.

BACKGROUND

Degradable materials can change their mechanical, physical and responsive properties upon thermal, hygroscopic, and/or chemical interaction with their environment, or upon interaction with mechanical, physical or chemical triggers. Degradable materials provide acceptable performance for a certain period of time and after fulfilling their intended applications, the materials degrade or dissolve away in the downhole environment, which saves both time and cost which is associated with drilling out or retrieving non-degradable materials. Degradable materials are of particular interest to the oil field industry especially because of this time-and cost-saving potential.

SUMMARY

This summary is provided to introduce a selection of concepts that are further described below in the detailed description. This summary is not intended to limit the scope of the claimed subject matter.

Embodiments may generally take the form of a degradable composite structure and a method for controlling the rate of degradation of a degradable composite structure. An example embodiment may take the form of a degradable polymer matrix composite (PMC) including a matrix having: a degradable polymer, a fiber reinforcement, and particulate fillers. The fiber loading is between approximately 10% to 70% by weight and the particulate loading is between approximately 5% to 60%.

Further features and advantages of the subject disclosure will become more readily apparent from the following detailed description when taken in conjunction with the accompanying drawings.

BRIEF DESCRIPTION OF THE DRAWINGS

The subject disclosure is further described in the detailed description which follows, in reference to the noted plurality of drawings by way of non-limiting examples of the subject disclosure, in which like reference numerals represent similar parts throughout the several views of the drawings, and wherein.

DETAILED DESCRIPTION

Figure 1A:
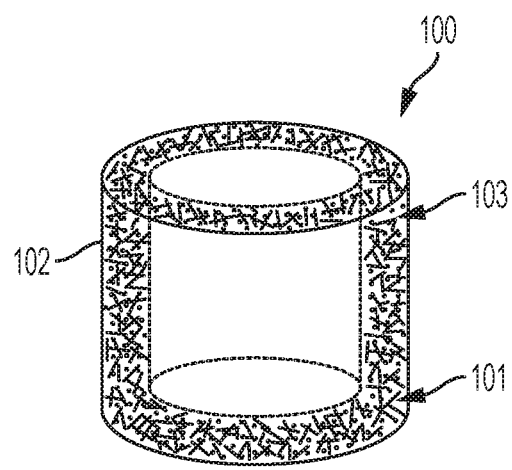
FIG. 1A depicts catalysts as solid particles compounded into the polymer matrix and FIG. 1B depicts reinforcing short fibers and solid catalyst particles compounded with a degradable polymer matrix to form a tube, the composite tube degradable in water over time.

The particulars shown herein are by way of example and for purposes of illustrative discussion of the examples of the subject disclosure only and are presented in the cause of providing what is believed to be the most useful and readily understood description of the principles and conceptual aspects of the subject disclosure. In this regard, no attempt is made to show structural details in more detail than is necessary, the description taken with the drawings making apparent to those skilled in the art how the several forms of the subject disclosure may be embodied in practice. Furthermore, like reference numbers and designations in the various drawings indicate like elements.

Degradable materials can be used in various different applications and tools in the oil field. For example, degradable materials may be used as materials for zonal isolation, bridging, plugging or as degradable parts/components in downhole devices. In some applications, the degradable materials have certain mechanical properties in to fulfill the intended functions before degradation starts.

Polymers are good candidates as degradable materials due to the variety of available chemistry to trigger the degradation, and the available technologies to reinforce polymers with particulates and/or fibers to form degradable polymer matrix composites (PMC) for improved mechanical properties and controllable degradation. PMC include polymer as the continuous phase and particulates (aspect ratio between approximately 2-50) or fibers (aspect ratio greater than approximately 45-55) as the reinforcement. The matrix (continuous phase) performs several functions, including maintaining the fibers in the proper orientation and spacing and protecting them from abrasion and the environment. In polymer composites that form a strong bond between the fiber and the matrix, the matrix transmits loads from the matrix to the fibers through shear loading at the interface. In the degradable PMC, the continuous polymer matrix also functions as the degradable phase.

The reinforcing phase which is harder, stronger, and stiffer than the matrix provides the strength and stiffness of the composite. Continuous fibers have long aspect ratios, while discontinuous fibers (chopped sections of continuous fibers) have short aspect ratios. Continuous-fiber composites normally have a preferred orientation, while discontinuous fibers generally have a random orientation. Typical fibers include glass, polymer (aramid), carbon, boron, ceramics and metal which may be continuous or discontinuous. The type and quantity of the reinforcement determine the final properties. Soluble glass fibers are rarely used in fiber reinforced composites. For the purpose of complete degradation, soluble and degradable fibers including water soluble glass fibers (p-glass), biodegradable fibers such as cellulose fibers, acid soluble metal fibers, and glass fibers may be desirable in d-PMC. For practical applications in the oil and gas industry, the mechanical properties and the rate of composite degradation may be balanced.

The subject disclosure relates to the design of materials to control the rate of degradation at different temperature ranges, processes to bring heat sources to a downhole environment to accelerate the degradation, and the design of materials to balance both the mechanical properties and degradability.

Example embodiments may take the form of designs of degradable PMC in which degradable polymers are used as the matrix. The degradable polymers for the matrix in PMC may include aliphatic polyesters, poly(lactic acid) (PLA), poly(ε-caprolactone), poly(glycolic acid) (PGA), poly(lactic-co-glycolic acid), poly(hydroxyl ester ether), polyhydroxyalkanoate (PHA), poly(hydroxybutyrate), poly(anhydride), polycarbonate, poly(amino acid), poly(ethylene oxide), poly(phosphazene), polyether ester, polyester amide, polyamides, sulfonated polyesters, poly(ethylene adipate), polyhydroxyalkanoate, poly(ethylene terephtalate), aliphatic polyethers, poly(butylene terephthalate), poly(trimethylene terephthalate), poly(ethylene naphthalate), polyamide (nylon), polyurethane and copolymers, blends, derivatives or a combination of any of these degradable polymers. PLA, PGA, PA, PET, PBT, and PHA, and their breakdown products, are non-toxic. These are readily available in a variety of molecular weights and degrees of crystallinity and are easily prepared.

In some example embodiments, the fiber reinforcement may include continuous fibers. In some example embodiments, the fiber reinforcements may include discontinuous fibers. In some example embodiments, the fiber reinforcement may include continuous and discontinuous fibers. Examples of reinforcing fibers may include glass fibers, carbon fibers, polymer fibers (aramid fibers, nylon fibers, etc), boron, ceramics, metal fibers as well as water soluble, acid soluble, and biodegradable fibers. An example embodiment may include one or more types of reinforcing fibers. The fiber loading is in the range of about 10% to 70% by weight. For example, the fiber loading may be in the range of about 10% to 60%, 20%-70%, 20%-60%, 30%-50%, or any suitable range.

For the purpose of reducing the residual materials after degradation, discontinuous fibers may be implemented for strength and stiffness in the degradable PMC. In other cases, water soluble glass fibers (for example, discontinuous or continuous phosphate-glass fibers), acid soluble metal fibers, and biodegradable nature fibers such as cellulose fibers can be used as the reinforcement. The resultant PMC may completely degrade in aqueous fluids, leaving little residual material in a downhole environment.

One or more other particulate fillers can be used to improve strength and stiffness. Particulate fillers may include, for example: clay, talc, aluminum trihydrate (Al(OH)$_3$), calcium carbonate, magnesium carbonate, glass beads, silica, silicate minerals, microspheres, ceramic particles, metals powders, mica, and Al$_2$O$_3$. The particulate loading is in the range of about 5% to 60% by weight. For example, the particulate loading may be in the range of 5% to 50%, 15% to 60%, 5% to 50%, 15% to 50%, or any suitable range.

One or more of: flame retardants, impact modifiers, coupling agents, plasticizers, pigments, UV stabilizers, anti-oxidants, anti-fouling agents, and other functional additives can be included in the PMC to introduce other performance properties such as thermal or electrical conductivity, UV stability, and fire resistance, for example. These fillers may include by way of example: carbon black, carbon nanotubes, graphite and graphite nano-platelets (GNP), impact modifiers such as DuPont™ Biomax TH300, core-shell polymers, rubber particles, and PHA (Metabolix), plasticizers, coupling agents/or adhesive promoting agents such as silane, 2-hydroxyethylmethacrylate acid phosphate, 2-hydroxyethyl methacrylate phosphates, long chain fatty acids, and their ester derivatives.

The rate of matrix degradation is dictated by the formation temperatures, pH of the fluids and the inherent property of the polymer (type of chemical bonds, crystallinity, etc) and any catalysts used in the composite. As the formation temperatures and the pH of the fluids are limited by the environments and the particular requirement of the operations, the choice of the polymer and the use of catalysts/functional fillers are the preferred method for controlling the rate of degradation, especially when the catalysts are incorporated into the composites.

Catalysts to control the rate of matrix degradation may include, for example: Ca(OH)$_2$, Mg(OH)$_2$, CaCO$_3$, Al(OH)$_3$, Borax, MgO, CaO, ZnO, CuO, Al$_2$O$_3$, ZrO$_2$, oxides of titania, zirconia, magnesia, a base or a base precursor in the form of particles, films, sheets, foams or combination of these shapes. Solid acids include polymers, for example polyesters such as PLA, PGA, PHA, PET, PBT etc. that can degrade to release acids, anhydrides, long-chain fatty acids, silica, alumina, zeolites, solid acid sulfates and selenates, aluminium chloride, tungsten oxide, ferric chloride, antimony fluoride, titanium chloride and tin chloride. Other water soluble and phase changing fillers could also be used. These include salt (NaCl), KCl, ZnCl$_2$, CaCl$_2$, MgCl$_2$, NaCO$_3$, KCO$_3$, potassium phosphate (KH$_2$PO$_4$, K$_2$HPO$_4$, K$_3$PO$_4$), sulfonate salts such as sodium benzenesulfonate (NaBS) and sodium dodecylbenzenesulfonate (NaDBS), water soluble/hydrophilic polymers, poly(ethylene-co-vinyl alcohol) and poly(vinyl alcohols) (PVOH), modified PVOH, and a mixture of these additives in the form of particles, films, sheets, foams, and a combination of these shapes. The loading of the catalysts is in the range of 5% to 50% by weight.

Figure 1B:
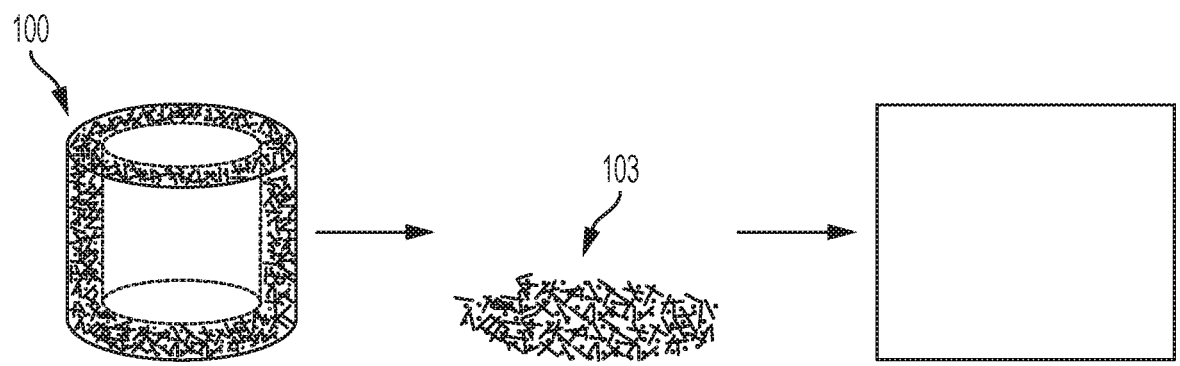

In an embodiment, the catalysts 101 as solid particles are compounded into the polymer matrix 102 as shown in FIG. 1A. Conventional extrusion processes can be used to incorporate the catalysts 101 and the chopped fibers 103 into the polymer matrix 102, and the final parts can be made into a desirable shape using any suitable process such as an extrusion or molding process, for example, using injection molding or profile extrusion. The resultant part 100 will degrade in water to leave fibers 103 as residuals. If soluble fibers are used in the part, the fibers will eventually dissolve in the downhole fluids to leave few residuals (FIG. 1B). FIG. 1B illustrates the degradation process of the part 100 from a structural shape to remaining fibers after the polymer matrix dissolves and finally no remaining constituent parts upon full degradation.

Figure 2:
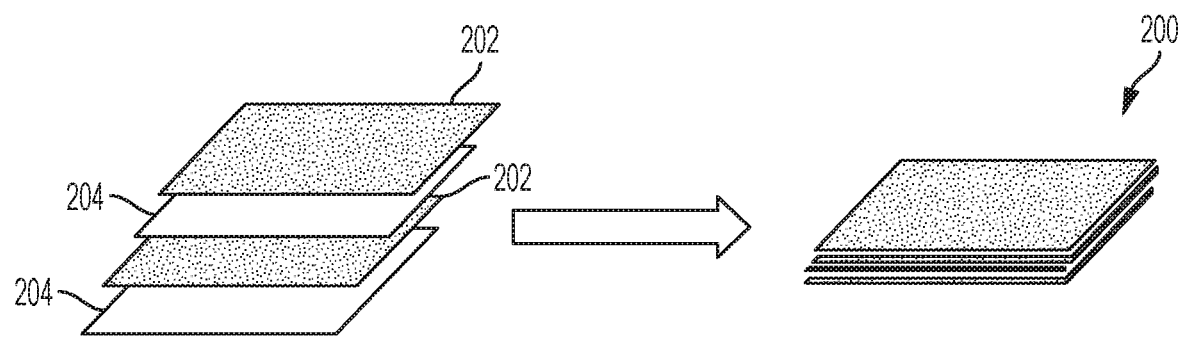
FIG. 2 depicts a nylon prepreg layered alternately with a film of catalyst.
Figure 3:
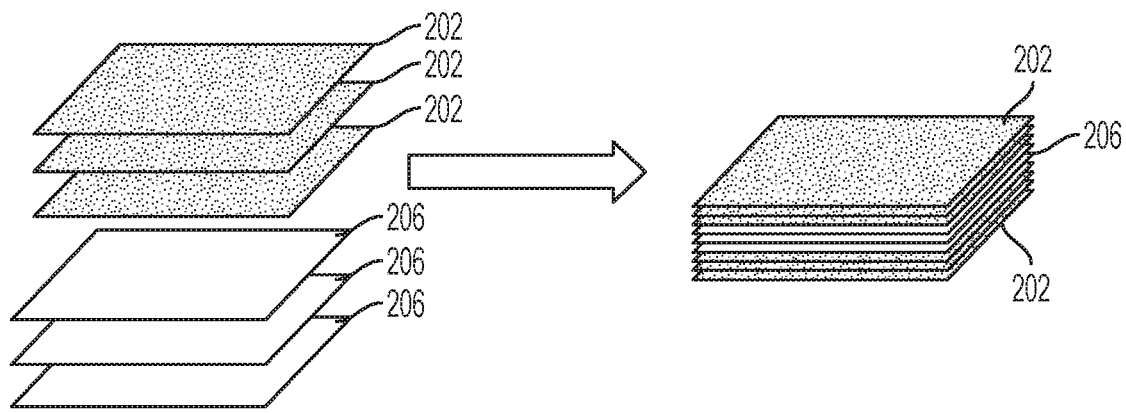
FIG. 3 depicts a nylon composite tape sandwiched between multiple layers of solid catalysts.
Figures 4A, 4B, 4C, 4D, 4E:
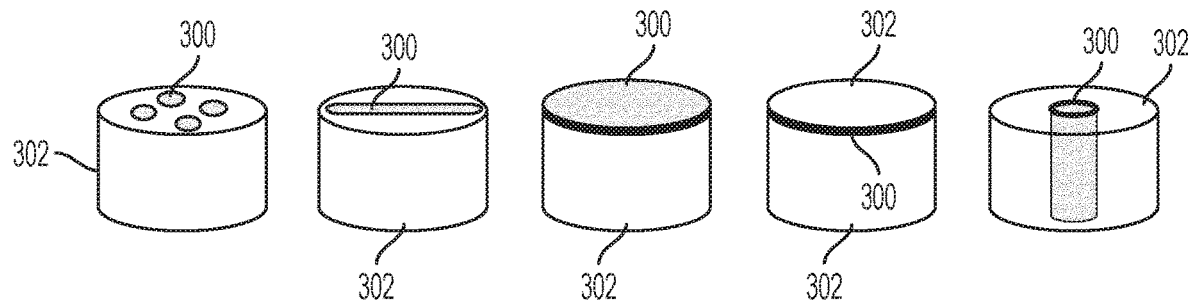
FIG. 4 depicts degradable PMCs with reactive pressed Ni—Al powered mixture (grey).

In other embodiments, the d-PMC comprises a layered structure of composite tapes or prepreg (degradable polymers pre-impregnated on fibers or woven) and films, sheets of foams or a composite tape/prepreg of a solid catalyst. Tape may also be pre-treated and rendered porous/permeable to facilitate imbibition of acids or bases inside its matrix or allow insertion of heating agents. FIGS. 2 and 4 depict two examples. In FIG. 2, the composite tape 200 (e.g., nylon tape 202 from TENCATE®) may be layered alternately with a film of solid acid 204 (for example, a film of PLA). The hydration of the solid acid or base produces acids or bases that catalyze the hydrolytic degradation of nylon at high temperatures (>120° C.) in a downhole environment. In FIG. 3, the layers of nylon tape 202 are sandwiched with several layers or a thick sheet of solid catalyst 206. These layered designs may produce a structure in the form of a cylinder, a tube, a block, a sphere or any combination of these shapes.

Heating of the polymer matrix locally is another way to accelerate the degradation. One way to achieve this is to embed a reactive metal powder (such as Ni—Al metal powder) mixture 300 into the composite 302 (FIG. 4); the chemical reaction of the metal powders 300 will generate a large amount of heat, and this elevated temperature will help accelerate the degradation of the PMC. The Ni—Al powder mixture can be added to the surface or inserted in the PMC, in non-limiting examples, as isolated pellets, strips, coatings etc. It can also be sandwiched in the PMC parts (e.g., FIG. 4 at b and d) or added into the core of PMC (e.g., FIG. 4 at e).

Figures 5A, 5B:
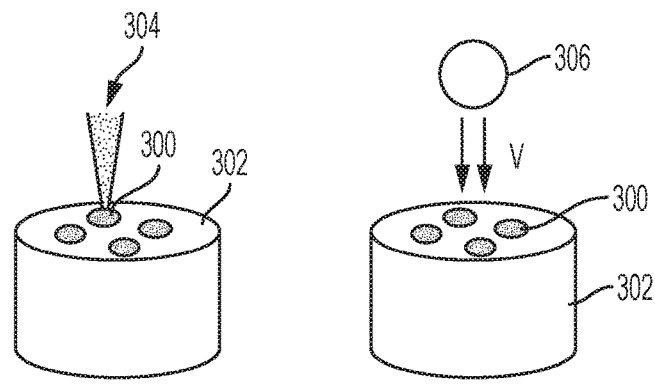
FIG. 5 illustrates methods for initiating the chemical reaction of the Ni—Al powder mixture.

The reaction of Ni—Al powder mixture can be initiated by either heat or shock loading. The heat to initiate the reaction can be generated by a local laser beam 304, or a local electrical heat source etc. (FIG. 5 at a). The shock loading can be generated by dropping a small ball/dart 306 or with any mechanical trigger attached on the degradable PMC parts (FIG. 5 at b). Other heat sources can be mounted either on a slick line, coiled tubing or wireline cable and brought to the proximity of the downhole structure to accelerate its degradation once the heat starts being released. Such sources can be activated from the surface using electric power when there is a cable or can be a chemical source inserted in a canister. Deployment on a wire or coiled tubing of a downhole heat source could become a substitute to drilling out those fixed structures provided that we are able to achieve degradation in a shorter time than using a drilling method.

In an embodiment, the pressed metal powder or 3-D print metal core may have degradable tape around it. Powder or pieces of the 3-D core will disperse after the tape degrades and it is possible to accelerate this or to compromise plastic layer integrity by using an external magnetic field (electromagnetic field). The easy degradable metal can be 3-D printed and impregnated by nylon and after metal degradation small particles of the plastic will float out. It is possible to use different porosity and cavities for the 3-D print for delay or acceleration of the degradation.

Figure 6:
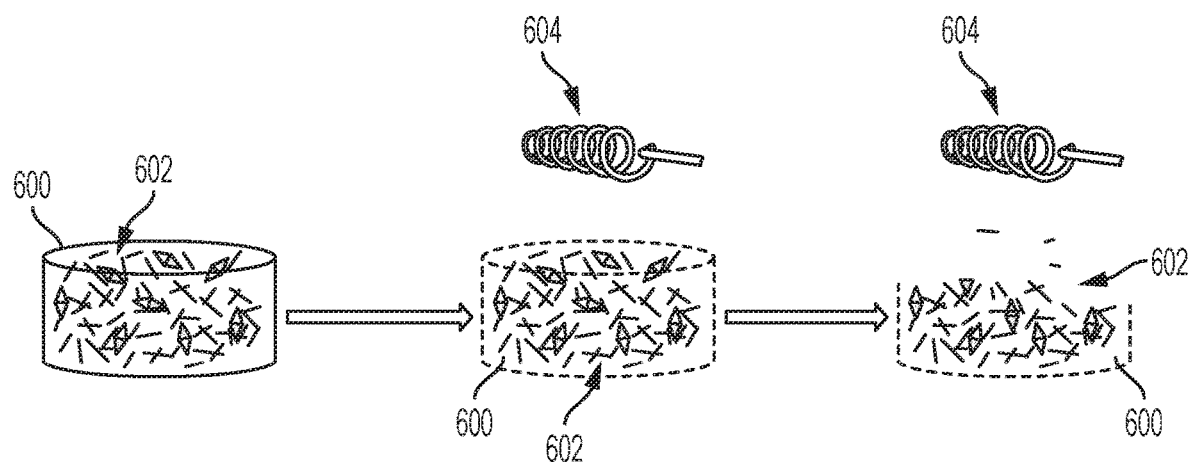
FIG. 6 illustrates superparamagnetic MagSilica® nanoparticles which are incorporated into the composite to generate induction heating under an electromagnetic field.

The local heating in the composite can be inductive as well. When ferromagnetic, paramagnetic or superparamagnetic particles or nanoparticles 602 are exposed to a constantly changing magnetic field 604, magnetically induced hyperthermia takes place, which can be used to heat up the media 600 (e.g., a degradable polymer matrix) that carries the particles. These particles 602 can be used as functional fillers in the matrix 600 of the composite materials. When an external magnetic field (electromagnetic field) 604 is applied in a downhole environment, the magnetic particles 602 heat up the polymer matrix 600 by inductive heating and accelerate the degradation (FIG. 6). Examples of ferromagnetic, paramagnetic or superparamagnetic particles include iron powders, steel powders, coated superparamagnetic FeO particles (Magsilica), nickel zinc ferrite particles (FP95, FP110, etc).

Figure 7:
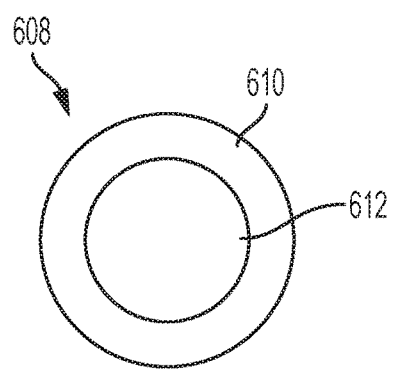
FIG. 7 illustrates a heterogeneous structure of a fast degradable composite or degradable metal core covered with a slow/non degradable outer layer of composite.

Since water is a reactant which causes degradation of the composite, for the situations that the PMC parts need to sit in the downhole environment (i.e. high temperatures) for a period of time in aqueous fluids before they degrade, different types of matrix composites can be designed into the same structure with the outer layers 610 of the structure 608 made from a more hydrophobic/less degradable composite. In this way, the structure 608 will have very slow degradation initially so that its mechanical strength is intact during its applications at high temperature in fluids. After water slowly penetrates the outer layers 610 and contacts with the more degradable inner structures 612, the degradation accelerates. This design ensures that the structure will have a window of working/functioning time before its degradation speeds up (delayed degradation, FIG. 7). The thickness of the outer layer 610 depends on the application conditions (the operating window, temperatures, fluid types) and the choice of the polymers. The thickness of the outer layer 610 could be in the range of about 1% to 95% of total weight. For example, the thickness of the outer layer 610 may be in the range of about 1% to 51%, 49% to 95%, 10% to 85%, 20% to 75%, 30% to 65%, and so forth. Relatively more hydrolysis-resistant polymers can be used as the matrix for the outer layer. The examples include epoxy, polyamide, polyurethane, polypropylene, polyethylene, polycarbonate, cyanate ester, vinyl ester, polyphenylene sulfide, bis-maleimides, phenolic formaldehyde, unsaturated polyester, polyester, polyimide, PEEK, fluoropolymer, polystyrene, silicon, etc. and combinations of these polymers.

Figure 8A:
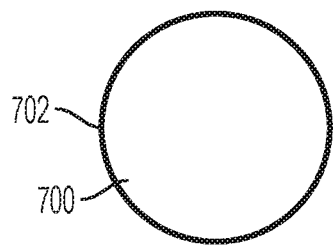
FIG. 8 illustrates cross-sections of the PMC parts coated with protective coating.
Figure 8B:
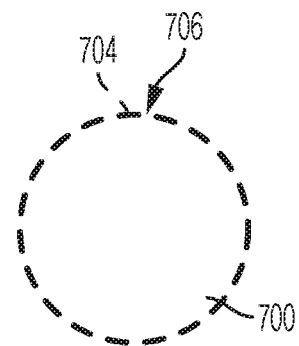
Figure 8C:
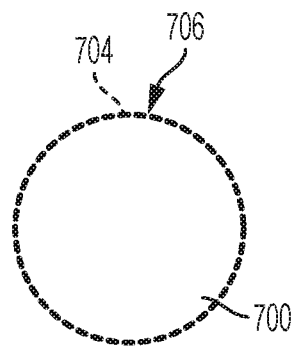

Coating is another option to have a delayed or timed degradation. A layer of coating 700 can be applied to delay water penetration into the parts 702. The material of the coating 700 can be either polymer or metal. The coating 700 can be deposited using in non-limiting examples, a thermal spray technique. Different coating thicknesses can be obtained by controlling the spray time. The parts 702 can also be fully or partially coated, depending on the requirements of the application (FIG. 8). For example, a coating 704 may include various gaps 706 as illustrated in FIG. 8 at b and c. The use of polymer films is that it may be sprayed without flames to form the polymer coating, so the degradation of the parts is limited. The material can be any protective polymer, such as epoxy, polypropylene, polyethylene, polycarbonate, cyanate ester, polyphenylene sulfide, bis-maleimides, phenolic formaldehyde, unsaturated polyester, polyimide, PEEK, fluoropolymer, polystyrene, polyamide, polyurethane, silicon, etc and combinations of these polymers. Metal coatings can also be applied to the PMC surface; the advantage of using metal coatings is that they not only delay water penetration, but also add more mechanical strength to the PMC parts.

Other additives could also be used in the polymer matrix to slow down the degradation. Example additives include, for example, hydrolysis inhibitors (fly ash, baking soda, carbodiimide, etc. weak base) and low surface energy additives to slow down water diffusion (fluoropolymer particles).

The degradable PMC can be customized to have mechanical properties that can meet the requirement of the desired applications. In some example embodiments, the properties of the degradable PMC may include: a tensile strength approximately equal to or grater than 20 MPa, a tensile modulus approximately equal to or greater than 1 GPa, and a heat deflection temperature (HDT) approximately equal to or greater than 60° C. With these mechanical properties, the degradable PMC can be used to fabricate many one-time use downhole tools that are currently made of metal. Examples include the loading tube in the perforating gun, darts and balls. Numerical simulation results show that for the loading tube made of degradable PMC, the maximum internal stress due to the weight of the charge (between approximately 0.3~0.6 kg) is less than approximately 0.9 MPa, two orders of magnitude smaller than its tensile strength. In addition, such a tool with typical geometries can sustain an external load on the order of approximately 1000 N without significant deformation (i.e., less than 0.1%).

Figure 9:
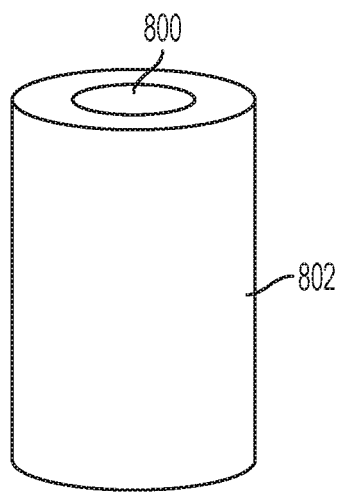
FIG. 9 depicts a degradable composite/metallic hybrid structure.

Additionally, composite/metallic hybrid structures could be designed. FIG. 9 shows an example of a high strength metal core 800 wrapped with degradable composites 802. The metal core 800 could even be replaced with a water soluble metal alloy so that the whole structure is degradable/soluble in some embodiments. The degradable metal/composite hybrid materials could be produced into forms of cylinders, tubes, blocks or spheres or any other desired shapes or structures.

Figure 10:
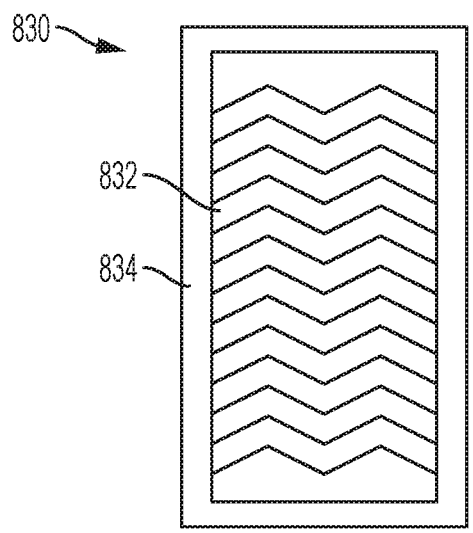
FIG. 10 depicts an example of a composite/metallic structure with interlocking metal pieces as the core.
Figures 13A, 13B:
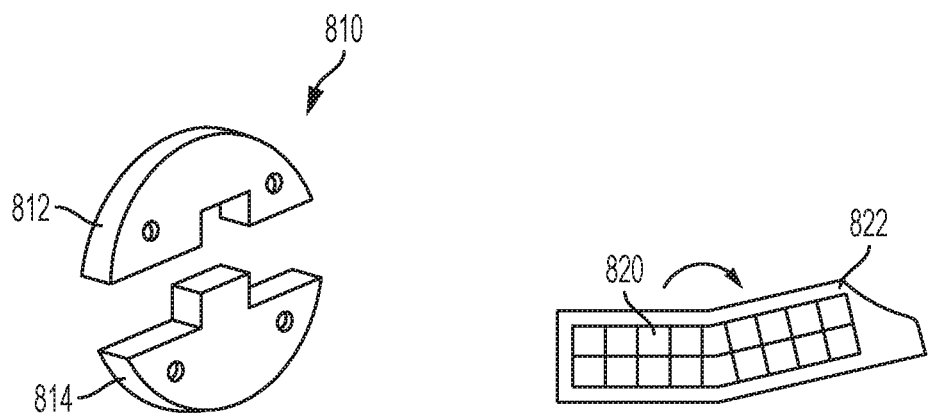
FIG. 13 illustrates examples of composite/metallic structures, in non-limiting examples.
Figure 13B:
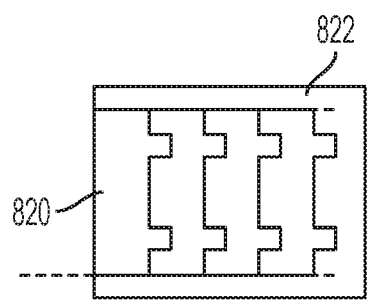

The composite/metallic hybrid structures 810 could have interlocking metal pieces 812, 814 as the core and the degradable materials such as the degradable composite tapes as the outer layer. This could also be an overmolded part 822 having an interlocking metal pieces 820 with a degradable composite layer as the outer layer that allows for the movement of part (FIG. 13 at b and b'). The degradable composite material may be molded around the interlocking metal core or otherwise applied to the metal core in any suitable manner. FIG. 10 shows an example of the core 830 made of interlocking metal pieces 832 and wrapped with degradable fiber tape 834. In some embodiments, the interlocking metal pieces may include alignment members so that adjacent members are aligned with each other. In some embodiments, adjacent members may couple together through a tight fit or other suitable mechanism. In some embodiments, adjacent members may not have a tight fit. The outer layer 834 makes the inner core 832 behave as a solid structure under compression in some embodiments. Upon degradation of the outer layer 834, the metallic core pieces 832 fall apart and are small enough that they either may flow back or fall to a rat hole.

Figure 11A:
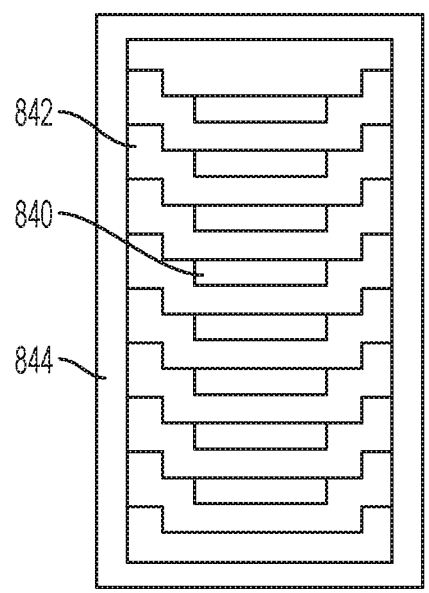
FIGS. 11A and 11B illustrates examples of composite/metallic structures with interlocking metal pieces as the core and cavities in the core.
Figure 11B:
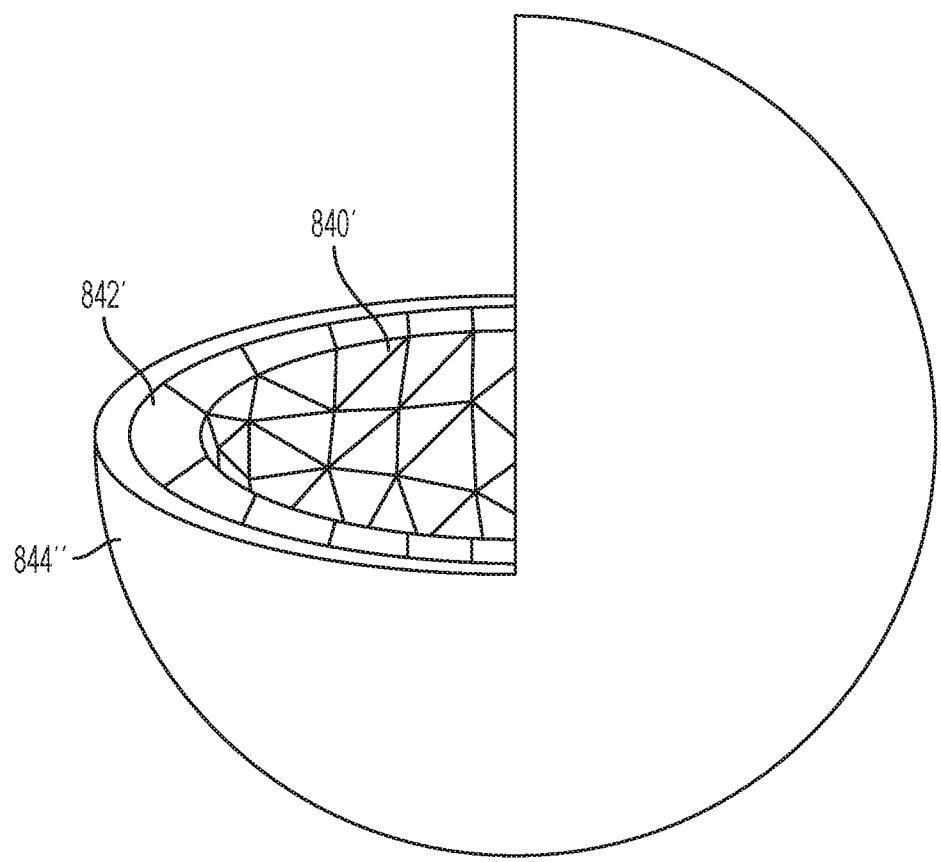

Cavities 840 can be included between interlocking pieces 842 or the interlocking pieces 842' may form a cavity 840'. The interlocking pieces 842 and 842'may be covered with degradable composite tapes 844 and 844'. These cavities 840 and 840' can be left empty so that under downhole conditions the outer pressure keeps the device under compression, providing structural stability (FIGS. 11A and 11B). In FIG. 11B, the inner layer 842' may be made o fsmall interlocking metallic pieces forming a continuous spherical of similarly closed surface with an inner cavity. The cavities 840 and 840' can also be used to hold other additives, chemicals or materials for other functions. For example, the cavities can contain chemicals (solid acid, for example) to control the degradation/corrosion of the outer layers, the metal pieces, or even other supporting structures (such as ball seats and/or plug seats used in multi-stage fracturing operations) for the composite/metallic hybrid structures. The cavities could also contain chemicals to modify the properties of local fluids such as the pH, viscosity, conductivity, salinity, density etc. of the fluid, or to initiate other functions such as crosslinking, oxidization, reduction, anti-bacteria (biocide), etc. The cavities could also contain reactive Ni—Al metal powder mixture to generate an even larger amount of heat to accelerate the degradation of the structure.

Figure 12:
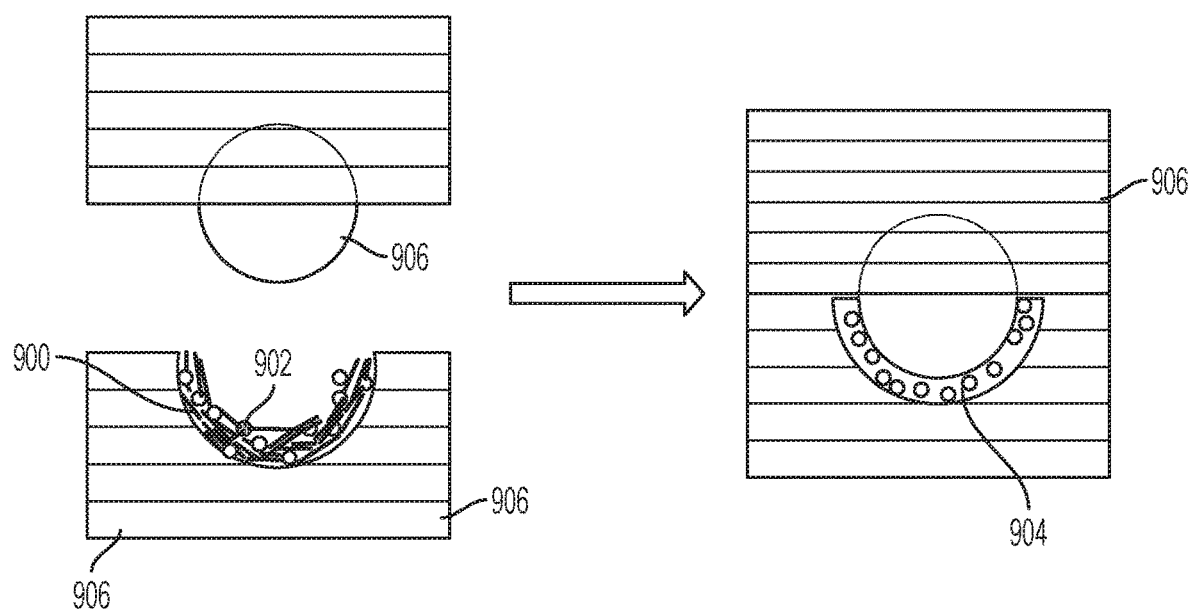
FIG. 12 illustrates compression molding chopped nylon prepreg with a catalyst.

A high speed thermal process is developed to consolidate the prepreg/tape in-situ to form composite cylindrical and complex structures with continuous fiber reinforcement (Automated Dynamics). Conventional compression molding processes can also be used to mold chopped prepreg 900 with degradation catalysts 902 for complex structures 904 (FIG. 12). The mold 906 may take any appropriate form, such as asphere for example, and chopped nylon tapes with catalyst 900 may be placed in the mold to form the shape.

The degradable composite with or without reactive fillers may be implemented in a variety of oil field and other tools. For example, the degradable composite may be used for zonal isolation in multi-zone stimulation using sliding sleeves, bridge plugs, isolation plugs or downhole devices which can be inserted in a casing or tubing with degradable parts/components such that a specific reservoir formation can be targeted and accessed in a downhole environment. In the case of sliding sleeves, one current method for actuating the sliding sleeves for multi-zone fracturing operations is to drop untethered balls or darts of graduating sizes to land on target sleeves. The balls form a seal with the sleeve and create a restriction to build fluid pressure against. At a certain pressure, the sleeve shifts and expose fracture ports or slots that allow hydraulic communication between the internal diameter of the casing or tubing and the formation in the current target zone. This hydraulic communication allows the operator to fracture the target zone. The target sleeves are run as part of the completion and can either be cemented in place, or external casing packers may be used to isolate the zones.

Once the fracturing operations are complete, removal of the untethered objects and/or seats establishes fluid circulation within the well. The most common method for removal of these objects is to mill out the objects using coiled tubing operations. Since a milling operation can be very time consuming and costly, it is desirable to eliminate this step. Using degradable composites with or without reactive fillers to manufacture the balls, darts, and/or seats is one of the applications for the materials as disclosed.

Current technology for passive degradable balls or shaped plugging devices which can be dropped from the surface in a multi-zone stimulation application exists and has been used in the oilfield as described above. The ball functions to provide a seal and hold fracture pressure for a period of hours and degrade over a period of days. However, due to geometry constraints with the rapidly decreasing diameter of the seats which creates an increasing flow restriction, the ball drop system may only be used to target 20-30 zones. In addition, the passive degradation of the ball material in the downhole environment does not allow for the seats to be made of a similar material. This is due to the fact that the seats are run in hole with the completion and may be exposed to the downhole environment for many days before performing their intended function. Therefore, on many occasions, despite using a passively degradable material for the ball drop systems, coiled tubing milling operations must occur to clear out the restrictions due to the seats.

Using a degradable composite material with or without reactive fillers can enable the sleeves to be made of the same material. The material can be placed downhole on the completions string for an extended period of time, allowing the sleeves to perform their intended interaction with the untethered object or shifting tool. Once the sleeves have been shifted and fracturing operations completed, the sleeves and objects left in the wellbore can be triggered to degrade by sending down either another object to initiate the degradation process through impact or a localized heat source. This process may be much quicker and more efficient at removing the seats and/or untethered objects than coiled tubing milling operations.

Figure 14:
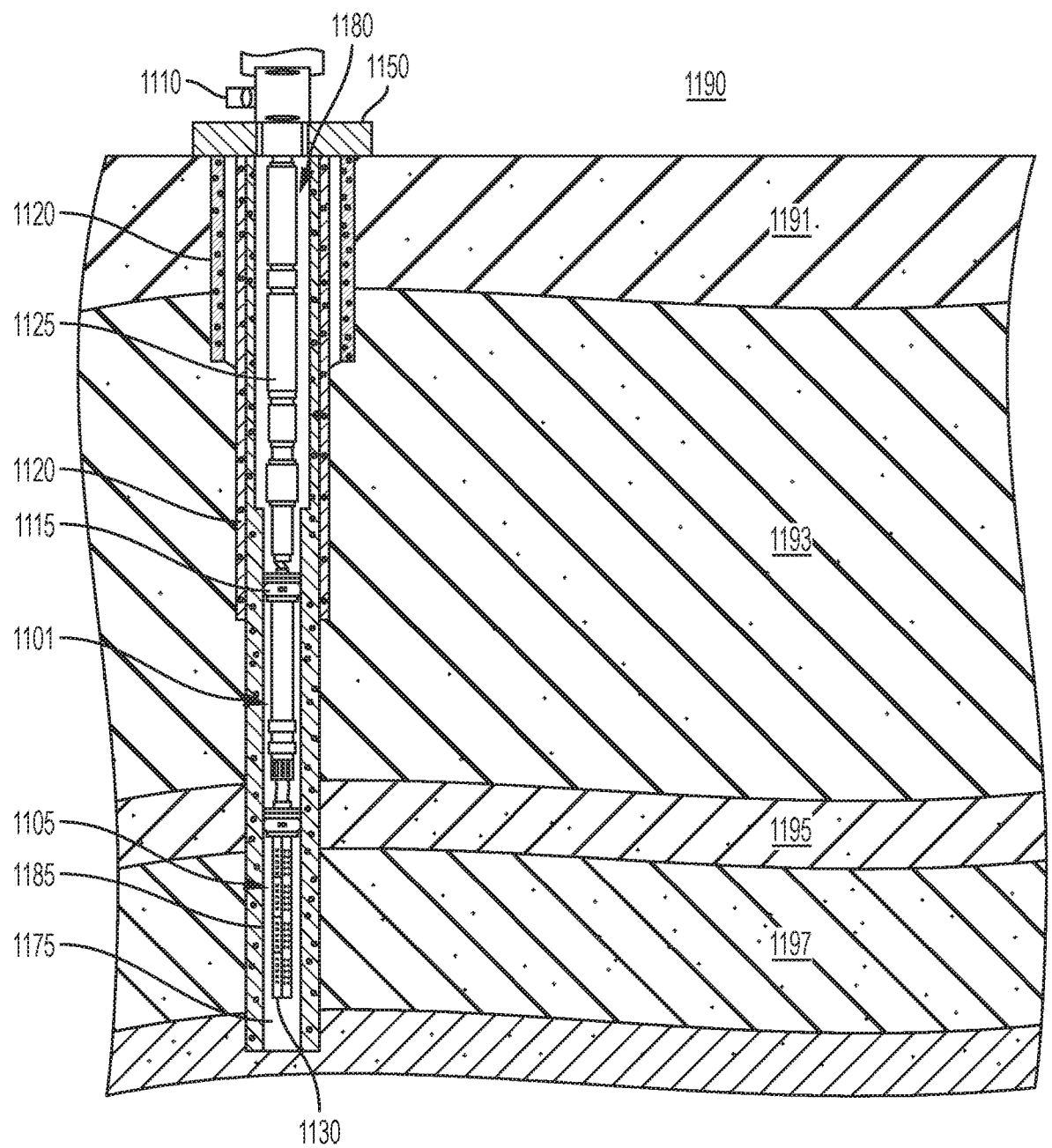
FIG. 14 illustrates an example wellbore with completion tools and a perforating gun disposed therein.

Embodiments may take the form of a degradable of disappearing perforating gun, for example. The disappearing perforating gun may be directed to eliminating/reducing the rat hole below the perforating gun, among other possible motivating factors. Conventionally, rat holes receive a gun (or other tools) at the bottom of a well after an operation, such as a perforating operation, has been performed. In some embodiments, a disappearing chamber gun may be implemented with a degradable loading tube or a foam tray to support the shaped charges, as shown in FIG. 14. Using a loading tube or tray that is degradable, is one method and component that may be used to generate a carrier tubular that is free of debris and able to produce fluids from the reservoir, unimpeded.

FIG. 14 illustrates an example oilfield with a well 1180 accommodating completions hardware which may be dual purposed as production tubing and completions hardware. In the embodiment shown, the lower completions hardware 1101 of the system includes a perforating gun 1105 that is integrally incorporated thereinto. Specifically, the gun 1105 is also in direct tubular communication with upper completions production tubing 1125 and includes a dissolvable internal support system as detailed further below. Thus, while initially serving as a perforating gun 1105, this portion of the hardware may later serve as a conduit for fluid flow.

Utilizing completions hardware for the dual purposes of perforating and subsequent fluid flow as noted above may be of significant benefit to offshore operations as depicted in the embodiment of FIG. 14. For example, the oilfield of FIG. 14 is in an offshore environment with a well head 150 and pressure control equipment 1110 mounted at a seabed. In addition to being located several hundred feet or more below water 1190, completing the well 1180 may require drilling several thousand feet further, past a variety of formation layers 1191, 1193, 1195 before reaching a targeted production layer 1197. Thus, even setting aside the added amount of time and expense dedicated to properly drilling, placing cement 1120, installing casing 1185, or delivering completions hardware, even the most time-efficient trip into or out of the well 1180 may require a day or more of otherwise non-producing time. However, a dual purpose perforating gun 1105, for perforating and subsequently accommodating fluid flow, may minimize time and expense in terms of both drilling and trips into the well 1180.

The perforating gun 1105 of FIG. 14 is shown installed as part of permanent completions hardware. That is, as opposed to installing lower completions hardware 1101 without a gun 1105 and later delivering a gun 1105 on another trip into the well 1180, the time dedicated to such a trip is saved and the perforating gun 1105 is supplied at the same time the lower completions hardware 1101 is installed. However, in addition to saving trip time dedicated to perforating, time and expense are also saved in terms of drilling. That is, as shown in FIG. 14, a terminal space 1175 at the tail end of the well 1180 extends beyond the terminal end 1130 of the gun 1105 by only a short distance. As opposed to a more conventional "rat hole" extending 50-100 feet or more and taking two days or more to drill, the terminal space 1175 of FIG. 14 may extend no more than 5-25 feet in depth beyond the terminal end 1130 of the gun 1105. Because the all or part of the gun may be degradable, there is no need for additional space for debris to accumulate.

Figure 15:
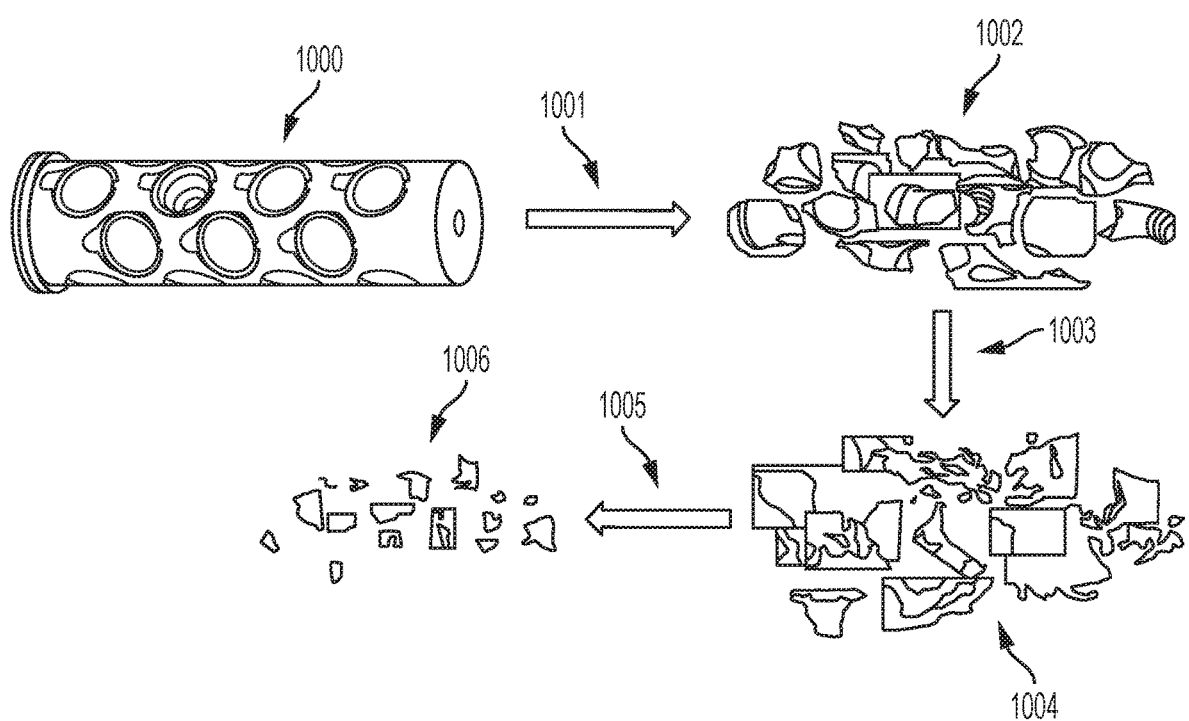
FIG. 15 illustrates loading tube made of degradable material in different stages of degradation.

Internal modeling of the materials' strength based on the dimension and weight of the shaped charges indicates that the loading tube should have a tensile strength of approximately 10-30 MPa (e.g., approximately 15-25 MPa, or approximately 20 MPa) at the operating temperatures, a modulus of approximately 0.5-1.5 GPa (e.g., approximately 1 GPa), and heat distortion temperature (HDT) up to approximately 90-100° C. (e.g., approximately 100° C.) before perforating. A loading tube 1000 will break down to debris 1002 after the gun fires 1001, and the debris 1004 should degrade in light brines at the defined temperatures in one (1003) to two (1005) days, as shown in FIG. 15, to allow for flow back of the gun particles or allow for the particles to fall to the bottom of the well to completely degrade without impeding flow of fluids. The operating/downhole temperature varies depending on the formation in which the gun is to be used and ranges from approximately 50-90° C. (Marcellus) to above approximately 150° C. (Haynesville).

Degradable polymer matrix composites may be used in some embodiments to make the degradable/dissolvable loading tube. In this example, aliphatic polyester based composites may be chosen as the examples for fabricating the degradable loading tube for applications in the temperature range of approximately 60-100° C. The composites may be reinforced with chopped/short glass or carbon fibers for desired mechanical properties (e.g., stiffness, strength, etc.). Internal or external additives/catalysts may be used to control the rate of degradation at the defined temperatures. Other functional additives such as impact modifiers may be incorporated into the composites for better performance properties.

Figure 16:
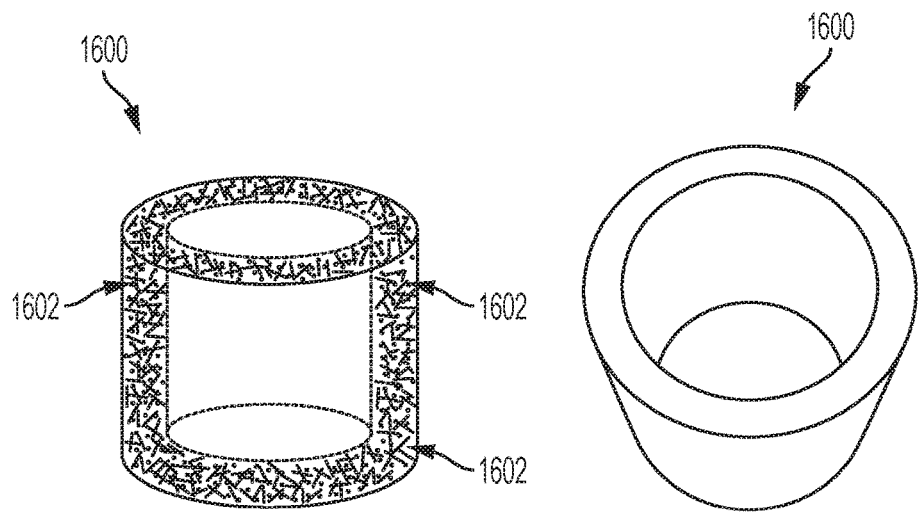
FIG. 16 illustrates an example tubular formed of PMC.

For operations at lower temperature ranges (e.g., approximately 60-100° C.), poly(aliphatic acid) based composites, such as polylactic acid, reinforced with chopped carbon or glass fibers may be useful for making the loading tube, as shown in FIG. 16. Solid base or base precursors, such as $Ca(OH)_2$, $Mg(OH)_2$, $CaCO_3$, $Al(OH)_3$, Borax, MgO, CaO, ZnO, CuO, $Al_2O_3$, $ZrO_2$, oxides of titania, zirconia, magnesia, are used to control/accelerate the degradation.

Different grades of PLA resins with various molecular weights and degrees of crystallinity, different grades of MgO with various surface areas and reactivity, and different volume fractions of glass fibers or carbon fibers and impact modifiers may be implemented in some embodiments. An example formula of a polylactic acid (PLA) composite is shown in Table 1 as an example formulation for compression molding or extrusion of the loading tube. Noting that various type of PLA blends or grades of MgO could be used in the formulation to fine tune the melt viscosity, mechanical properties and the rates of degradation. Table 2 listed some other grades of PLA and MgO that could be used in certain embodiments. The loading of the impact modifier is in the range of approximately 0-5%; the loading of MgO or other base or base precursors is in the range of approximately 0-20%; and the loading of chopped glass or carbon fibers is in the range of approximately 10-40%.

Chopped fibers, impact modifiers, nucleation agents and MgO were melt-compounded into PLA resin 1602 at approximately 170-200° C. using a single screw extruder. The MgO and PLA were dried in an oven overnight before compounding. ASTM standard D638-10 type I dog bones were injection molded and used to evaluate the tensile strength of the composite. A large tube 1600 shown in FIG. 16 was also compression-molded to demonstrate the practicality of manufacturing the formulation.

The tensile strength of the PLA composites tested at room temperature is in the range of approximately 25 to 90 MPa, varying due to the loading and grades of PLA, impact modifiers, fibers and MgO. The tensile strength at approximately 70° C. (above the glass transition temperature of PLA) is in the range of approximately 15-40 MPa. The storage modules measured by DMA is above 2 GPa at either room temperature or 70° C.

TABLE 1

An example formula of PLA composite for making a loading tube

| Ingredients | Grade | weight % |
|---|---|---|
| PLA resin | 2500HP | 54.5% |
| Impact modifier | Biomax Strong 120/or impact MB | 5% |
| Mineral filler | Elastomag MgO 100 | 10% |
| chopped glass fibers | E-glas (ave. 2 mm) | 30% |
| Nucleation agent | EBS, Ethylene bis(stearamide) | 0.5% |
| Total | | 100% |

TABLE 2

Choices of raw materials and their grade

| Resins | Grade |
|---|---|
| PLA 2500HP | Extrusion |
| PLA 3260HP | Molding |
| PLA 6302D | Molding |
| PLA 6060 | Fiber grade |
| PHA 4300 | Impact modifier |
| MgO | Elastomg 100 or 170 |
| MgO | Nalcon D176 |
| ZnO | 99% |
| E-glass fibers | Chopped |
| Carbon fibers | Chopped |

Figure 17:
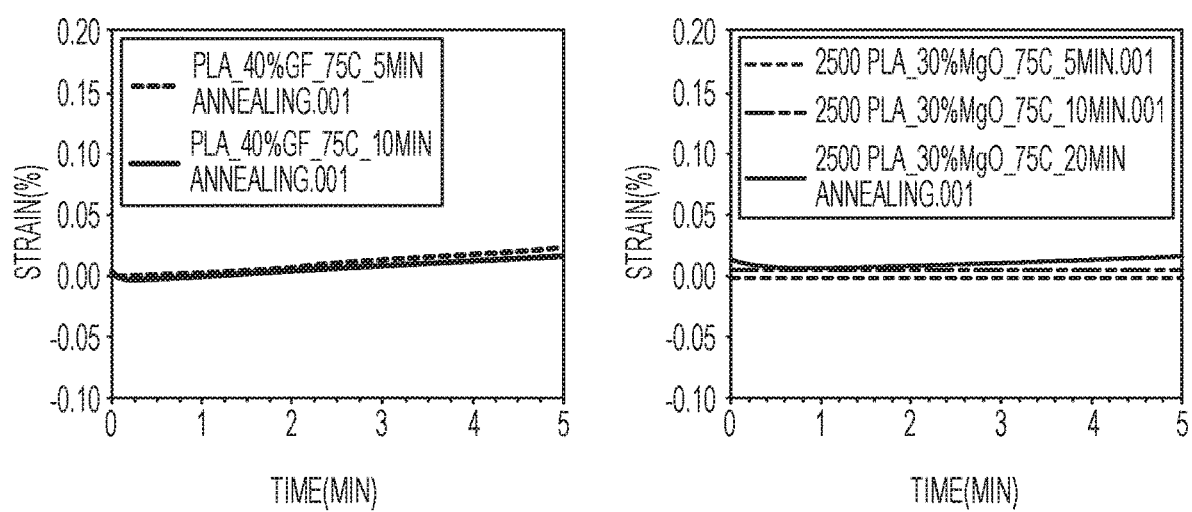
FIG. 17 illustrates plots of degradable PLA with glass fiber and without glass fiber.

As the degradable PLA-based loading tube may withstand a certain amount of constant load from the shaped charges, creep tests were conducted on these PLA-based composites to understand whether there is any creep induced by a constant load. The creep tests were conducted using TMA with a load of 1 N using a spherical tip. This load/pressure is higher than the load that the shaped charges would apply on the composites. The results show that there is not much creep under the applied load for all samples tested at room temperature. At 75° C., there is no creep for all samples with crystallinity (>20%), as shown in FIG. 17. Creep test at longer times (up to 2 days) was also conducted on selected samples; no creep was observed at 75° C.

Small blocks of the solid PLA composite samples 1800 were immersed in 20 ml of aqueous fluids in a bottle 1802. The bottles were placed in an oven at a defined temperature for a defined degradation time (a few days). Then, the samples were filtered, rinsed with DI water several times and dried in vacuum oven at 38° C. to remove any residual water. The weight of the residual sample was recorded and the weight loss % of fibers was calculated using the following equation:

Weight loss %(wl %)=($W0$−$Wt$)/$W0$, $W0$ is the original sample weight and $Wt$ is the weight of the dried residual fibers at the degradation time of $t$.

Figure 18:
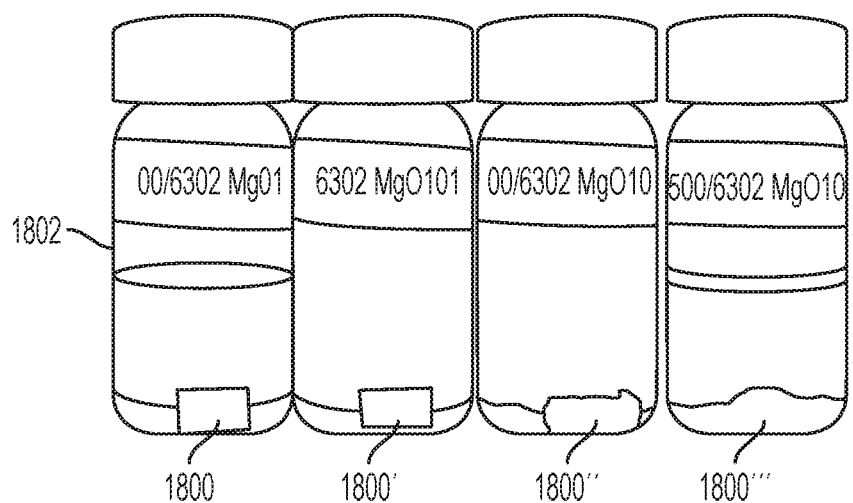
FIG. 18 shows images of a degradable polymer member as it degrades over a 24 hour period and in different solutions.

The typical weight loss % of these composites at approximately 60-70° C. in the fluid sequences of 3 hours of approximately 15% HCl (the structure 1800' is shown after 3 hrs in approximately 15% HCl) and approximately 20-24 hours of approximately 1% NaCl solution (the structure 1800' is shown after 20-24 hours in approximately 1% NaCl solution) is in the range of approximately 20-50% depending on the formulation. The samples broke into small pieces after approximately 24 hours in the fluid sequence, as shown in FIG. 18. After stirring, the structure 1800''' was unrecognizable.

At higher temperatures, hydrolysis inhibitor, such as Stabaxol® P, a carbodiimide, can be used to delay the rate of degradation of poly(aliphatic acid).

Figure 19:
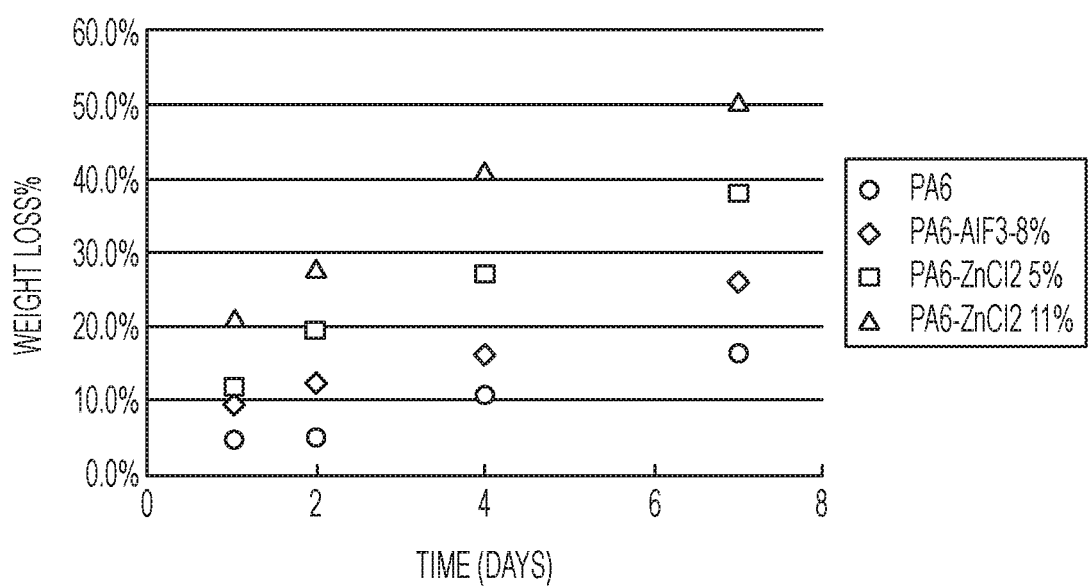
FIG. 19 illustrates a plot showing degradation trends of nylon 6 with different additives.

Although this present embodiments are focused on the degradable PLA composites for the application in the temperature ranges of approximately 60-100° C., other polymers, such as polyamides or PET based composites could be used at temperatures above approximately 100° C. The typical tensile strength of nylon composites with chopped glass or carbon fibers is above 100 MPa tested even at 98° C. in wet environment. Lewis acids, such as $AlF_3$, $ZnCl_2$ or $AlCl_3$ could be used as internal or external additives to control the rate of degradation. FIG. 19 shows the accelerated degradation of nylon 6 (PA6) at 150° C. with internal catalysts $ZnCl_2$ or $AlF_3$. The composites become brittle at around 15-20% of weight loss (within 1-2 days).

Although only a few examples have been described in detail above, those skilled in the art will readily appreciate that many modifications are possible in the examples without materially departing from this subject disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. It is the express intention of the applicant not to invoke 35 U.S.C. § 112, paragraph 6 for any limitations of any of the claims herein, except for those in which the claim expressly uses the words 'means for' together with an associated function.

We claim:

1. A perforating gun, comprising a degradable polymer matrix composite (PMC) with a controlled degradation, the PMC comprising:
 a matrix comprising:
  a degradable polymer;
  a fiber reinforcement, wherein the fiber loading is between approximately 10% to 70% of the total weight of the composite;
  particulate fillers, wherein the particulate loading is between approximately 5% to 60% of the total weight of the composite; and
  a catalyst, wherein the catalyst is between approximately 5% to 50% of total weight of the composite, wherein the degradable polymer, the fillers, the catalyst, or any combination of the three control the rate of degradation.

2. The perforating gun of claim 1, wherein the degradable polymer comprises at least one component selected from the group consisting of: aliphatic polyesters, poly(lactic acid)

(PLA), poly(c-caprolactone), poly(glycolic acid) (PGA), poly(lactic-co-glycolic acid), poly(hydroxyl ester ether), polyhydroxyalkanoate (PHA), poly(hydroxybutyrate), poly(anhydride), polycarbonate, poly(amino acid), polyethylene oxide), poly(phosphazene), polyether ester, polyester amide, polyamides, sulfonated polyesters, polyethylene adipate), poly(ethylene terephtalate), aliphatic polyethers, poly(butylene terephthalate), poly(trirnethylene terephthalate), poly(ethylene naphtalate), and polyurethane.

3. The perforating gun of claim 2, wherein the degradable polymer comprises copolymers, blends, derivatives or combinations of the degradable polymers.

4. The perforating gun of claim 1, wherein the fiber reinforcement comprises continuous fibers.

5. The perforating gun of claim 1, wherein the fiber reinforcement comprises discontinuous fibers.

6. The perforating gun of claim 1, wherein the fiber reinforcement comprises continuous and discontinuous fibers.

7. The perforating gun of claim 1, wherein the fiber reinforcement comprises one or more of: glass fiber, carbon fiber, polymer fiber, boron, ceramic, or metal fiber.

8. The perforating gun of claim 1, wherein the fiber reinforcement comprises at least one of: water soluble fibers, acid soluble fibers, or biodegradable fibers.

9. The perforating gun of claim 1, wherein the particulate filler comprises at least one of: clay, talc, aluminum trihydrate (Al(OH)$_3$), calcium carbonate, magnesium carbonate, glass beads, silica, silicate minerals, microspheres, ceramic particles, metals powders, mica, or $Al_2O_3$.

10. The perforating gun of claim 1, wherein the PMC further comprises at least one of: a flame retardant, an impact modifier, a coupling agent, a plasticizer, a pigment, a UV stabilizer, an antioxidant, or an anti-fouling agent.

11. The perforating gun of claim 10, wherein the PMC has one or more of: thermal conductivity, electrical conductivity, UV stability, or fire resistance.

12. The perforating gun of claim 1, wherein the PMC further comprises at least one of: carbon black, carbon nanotubes, graphite, and graphite nano-platelets (GNP), core-shell polymers, rubber particles, and polyhydroxyalkanoate, plasticizers, silane, 2-hydroxyethylmethacrylate acid phosphate, 2-hydroxyethyl methacrylate phosphate, long chain fatty acids, or the ester derivatives of long chain fatty acids.

13. The perforating gun of claim 1, wherein the catalyst comprises at least one of: $Ca(OH)_2$; $Mg(OH)_2$; $CaCO_3$; $Al(OH)_3$; Borax; MgO; CaO; ZnO; CuO; $Al_2O_3$; $ZrO_2$; oxides of titania, zirconia, magnesia, a base or a base precursor in the form of particles, films, sheets, foams or combination of these shapes.

14. The perforating gun of claim 1, wherein the catalyst comprises water soluble and phase changing additives.

15. The perforating gun of claim 14, wherein the water soluble and phase changing additives comprises at least one of: NaCl, KCl, $ZnCl_2$, $CaCl_2$, $MgCl_2$, $NaCO_3$, $KCO_3$, potassium phosphates, sulfonate salts, water soluble/hydrophilic polymers, poly(ethylene-co-vinyl alcohol), poly(vinyl alcohols) (PVOH), or modified PVOH, wherein the sulfonate salts include sodium benzenesulfonate (NaBS) and sodium dodecylbenzenesulfonate (NaDBS), and the potassium phosphates include $KH_2PO_4$, $K_2HPO_4$, $K_3PO_4$.

16. The perforating gun of claim 1, wherein the PMC further comprises heating materials that generate heat.

17. The perforating gun of claim 1, wherein the PMC further comprises a hydrolysis inhibitor.

18. A method comprising manufacturing the perforating gun of claim 1.

19. A method comprising using the perforating gun of claim 1 to perforate a well.

\* \* \* \* \*